US009573469B2

(12) United States Patent
Bianchi et al.

(10) Patent No.: US 9,573,469 B2
(45) Date of Patent: Feb. 21, 2017

(54) MECHANICALLY RECONFIGURABLE INSTRUMENT CLUSTER (71) Applicants: Andrew Bianchi, Northville, MI (US); Dale O. Cramer, Royal Oak, MI (US); Alexander Albanese, Ypsilanti, MI (US); Royce Duchante' Channey, Ann Arbor, MI (US); James Paul Farell, Canton, MI (US)

(72) Inventors: Andrew Bianchi, Northville, MI (US); Dale O. Cramer, Royal Oak, MI (US); Alexander Albanese, Ypsilanti, MI (US); Royce Duchante' Channey, Ann Arbor, MI (US); James Paul Farell, Canton, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 119 days.

(21) Appl. No.: 14/496,960

(22) Filed: Sep. 25, 2014

(65) Prior Publication Data
US 2016/0089979 A1    Mar. 31, 2016

(51) Int. Cl.
*B60K 37/02* (2006.01)
*G06F 3/14* (2006.01)

(52) U.S. Cl.
CPC .......... *B60K 37/02* (2013.01); *G06F 3/14* (2013.01); *G06F 3/1423* (2013.01); *B60K 2350/106* (2013.01); *B60K 2350/352* (2013.01); *B60K 2350/405* (2013.01)

(58) Field of Classification Search
CPC .......... B60K 37/02; B60K 2350/352; B60K 2350/405; B60K 2350/106; G06F 3/14; G06F 3/1423
USPC ......................................... 701/49
See application file for complete search history.

(56) References Cited

U.S. PATENT DOCUMENTS

| 2003/0128103 | A1* | 7/2003 | Fitzpatrick | B60K 35/00 340/425.5 |
| 2006/0061008 | A1* | 3/2006 | Karner | B29C 45/0017 264/250 |
| 2007/0013181 | A1 | 1/2007 | Heck | |
| 2014/0290421 | A1* | 10/2014 | Baumer | F16H 59/0204 74/491 |
| 2015/0029018 | A1* | 1/2015 | Bowden | B60K 37/02 340/461 |

FOREIGN PATENT DOCUMENTS

EP    0 813 340 A1    12/1997

* cited by examiner

*Primary Examiner* — John Q Nguyen
*Assistant Examiner* — Rodney P King
(74) *Attorney, Agent, or Firm* — Dickinson Wright PLLC (57) ABSTRACT A mechanically reconfigurable instrument cluster is provided. The mechanically reconfigurable instrument cluster includes a first display portion to display information of a first type, the first display portion includes a stem about the first display portion's axis driven by a motor; a second display portion to display information of a second type, the second display portion being configured to move in an inward and outward direction.

6 Claims, 6 Drawing Sheets

MECHANICALLY RECONFIGURABLE INSTRUMENT CLUSTER

BACKGROUND

Vehicles, such as automobiles, may be equipped with an instrument panel. The instrument panel may provide the operator with useful information for operating and driving the vehicle. The instrument panel may indicate the speed of the vehicle, the revolutions-per-minute (RPM) of the vehicle's engine, a present state of the lighting, a present state of the windshield wipers, for example. The instrument panel may employ mechanical gauges, digital displays, or a combination thereof to convey information about the status of the vehicle.

Instrument panels may be embedded or placed in the dashboard of the vehicle. This ensures that the instrument panel is in a line of sight for the vehicle's driver. Thus, the vehicle's driver may view the road while safely glancing at the instrument panel to obtain useful information for aiding in the operation of the vehicle. The instrument panel's placement is static, and thus fixed in a specific location.

The gauges of the instrument panel may be implemented with mechanical pointers, or digital displays, or combinations of both. A mechanical pointer is anchored at a pivot point, and driven by a motor (for example a stepper motor) in a 360 degree fashion. Based on the current employed to drive the motor, or control signals, the motor may move the mechanical pointer in a clockwise or counter-clockwise fashion. The mechanical pointer is conventionally longer in the direction in which the mechanical pointer is pointing at.

Traditionally, instrument clusters have primarily been analog and mechanical presentations. Thus, a pointer, or other type of mechanical interface may be implemented. The mechanical presentations may interface with various electronics associated with the vehicle, and provide information via indicators and indicia to an observer of the instrument panel.

Recently, instrument clusters have become digital in their presentation. The digital presentation allows for various types of electronic information to be presented to a vehicle's operator or passenger. The digital information may reflect all the information traditionally provided via the mechanical presentations. Additionally, the digital presentation device may also serve content traditionally associated with digital provided data. The content may be news, information, streaming content, and the like. The digital presentation device may be provided with an interface, such as an external operating device. The digital presentation device may also be incorporated with various touch screen technology, such as resistive touch or capacitive touch technologies.

Various implementations of instrument clusters have employed a combination of a mechanical elements and digital presentation devices. Thus, an implementer of an instrument cluster may employ the mechanical elements in situations where a mechanical presentation is preferred (i.e. for cost based reasons or aesthetic reasons) in combination with a digital presentation device. Thus, the advantages and extra content associated with the digital presentation device may be served to a vehicle's driver or occupant, while maintaining an aesthetic associated with mechanical elements commonly employed in an instrument cluster.

SUMMARY

A mechanically reconfigurable instrument cluster is provided. The mechanically reconfigurable instrument cluster includes a first display portion to display information of a first type, the first display portion includes a stem about the first display portion's axis driven by a motor; a second display portion to display information of a second type, the second display portion being configured to move in an inward and outward direction.

DESCRIPTION OF THE DRAWINGS

The detailed description refers to the following drawings, in which like numerals refer to like items, and in which.

DETAILED DESCRIPTION

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of each" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, X). Throughout the drawings and the detailed description, unless otherwise described, the same drawing reference numerals are understood to refer to the same elements, features, and structures. The relative size and depiction of these elements may be exaggerated for clarity, illustration, and convenience.

Instrument clusters have been implemented in a variety of manners and configurations. Traditionally, instrument clusters were a series of mechanical gauges or mechanical representations of information associated with the operation of a vehicle. The instrument cluster would be implemented in an orientation in which the driver or passenger of the vehicle was able to observe while operating the vehicle. A common location for the instrument cluster has been an area behind a steering wheel.

As stated in the Background section, recently, digital presentation devices have been incorporated along with instrument cluster implementations. Thus, information may be provided in a digital fashion in a manner that takes advantage of the various presentation capabilities of a digital presentation device. As such, the combination of mechanical gauges and a digital presentation device increase the techniques in which information may be provided.

However, due to the static nature of conventional instrument clusters, the presentation may not be optimized to take advantage of each medium's unique advantages. Because the mechanical gauges are shown at the same time as a digital presentation device, the digital presentation device may be obscured, or at a location not convenient to the passenger or driver of the vehicle. Thus, certain elements associated solely with a digital presentation device may not be realized.

Disclosed herein are a mechanically reconfigurable instrument cluster, and methods and systems for controlling a mechanically reconfigurable instrument cluster. The aspects disclosed herein allow for an instrument cluster to be in at least a first mode based on a preference, and mechanically reconfigure the instrument cluster when a transition from the first mode to the second mode is detected.

Thus, employing the aspects disclosed herein, a more robust instrument cluster is provided. The driver or passenger may realize a traditional instrument cluster presentation, or switch to a configuration that allows for engagement of the instrument cluster's digital presentation capabilities.

Figure 1:
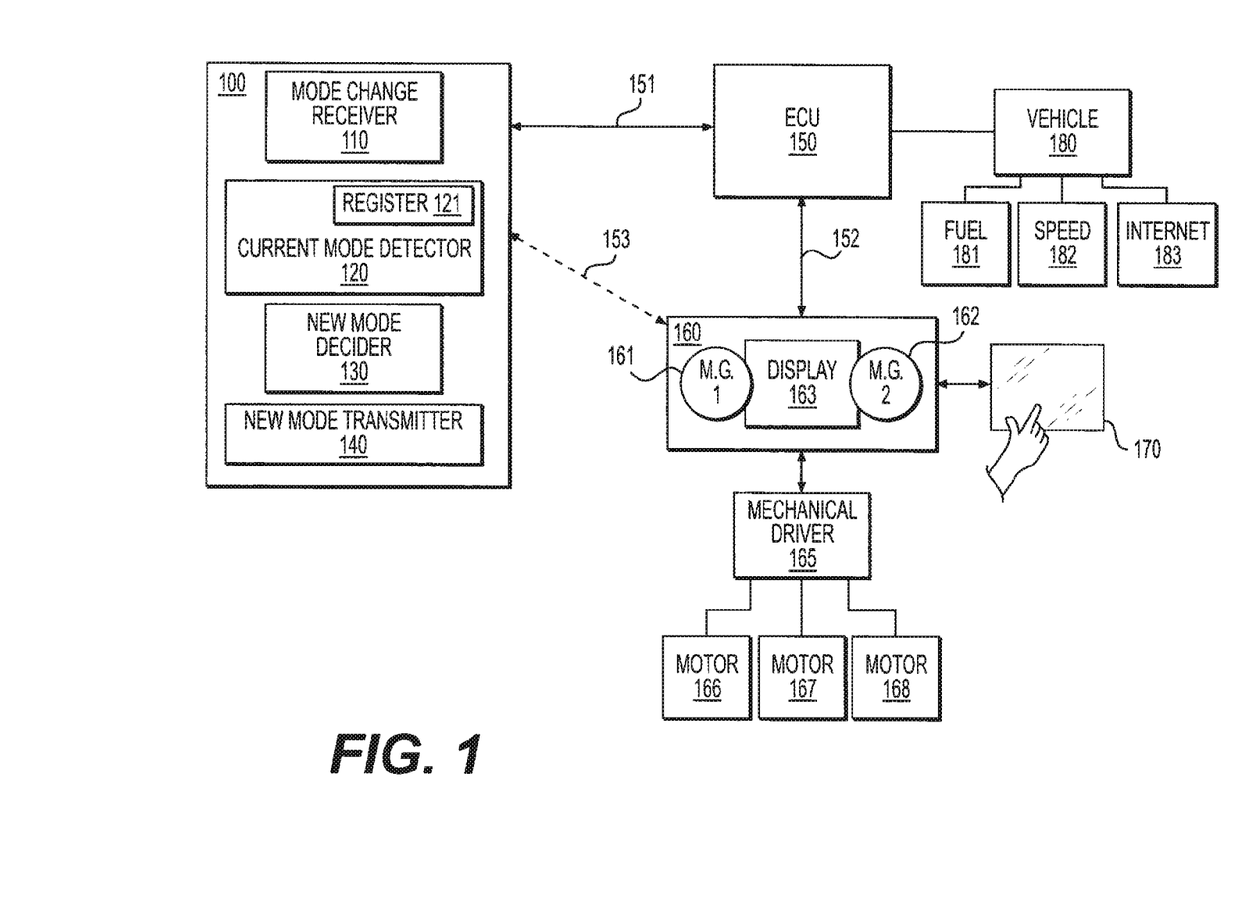
FIG. 1 illustrates an example of a system 100 for controlling a mechanically reconfigurable instrument cluster according to an embodiment disclosed herein.

FIG. 1 illustrates an example of a system 100 for controlling a mechanically reconfigurable instrument cluster according to an embodiment disclosed herein. The system 100 includes a mode change detector 110, a current mode detector 120, and a new mode transmitter 130. The system 100 may be implemented with a processor or non-transitory computer readable medium, installed or integrated in a vehicle.

The system 100 may be incorporated or integrated with an instrument cluster 160. However, in another embodiment, the system 100 may be stored in a secondary device, such as a persistent store associated with an electronic control unit (ECU) 150 associated with a vehicle. Thus, the system 100, the instrument cluster 160, and the ECU 150 may communicate with each other via a bus 151 and a bus 152.

The ECU 150 may serve as a central processor that allows communication to/from various aspects of a vehicle 180. The vehicle 180 may communicate with various electronic modules, such as a fuel sensor 181, a speed sensor 182, an Internet connection 183, or the like. The electronic modules implemented in FIG. 1 may be any known electronic modules known to one of ordinary skill in the art, and thus, are not limited by the examples shown in FIG. 1.

The ECU 150 may propagate the commands and information from the various electronic modules associated with vehicle 180, and communicates an instruction to the instrument cluster 160 accordingly.

The instrument cluster 160 includes a first mechanical gauge 161, a second mechanical gauge 162, and a display 163. Two mechanical gauges are shown; however, one of ordinary skill in the art may implement the system 100 shown herein with one or more mechanical gauges.

The display 163 may be any sort of digital presentation device known in the art, such as a OLED, OLEV, LCD, CRT technology driven device. The display 163 may receive information from any of the electronic modules shown associated with vehicle 180. For example, in one mode, the display 163 may display information associated with the speed of the vehicle 180 (as indicated by information from the speed sensor 182). In another implementation, the display 163 may receive and display information associated with the Internet connection 183.

The instrument cluster 160 may be implemented with an actuating device 170. In certain implementations, the actuating device 170 may be an engage-able button situated on or around the instrument cluster 160. In another case, the actuating device 170 may be a graphical user interface (GUI) icon displayed via the display 163. Thus, the display 163 may be any sort of touch screen interface. The actuating device 170 is not limited to touchable interfaces, and thus, any known human machine interface (HMI) technique may be implemented along with actuating device 170.

The ECU 150 may be any sort of electronic processor (implemented in hardware, software, or a combination of both) installed in a vehicle to allow the various electrical subsystems to communicate with each other.

The mode change receiver 110 may receive a signal via bus 151 from the ECU 150 (propagated from the instrument cluster 160 via bus 152) that a mode of the instrument cluster 160 is to be changed. In another example, the system 100 may be directly in communication with the instrument cluster 160, and receive a signal over bus 153.

An implementation of system 100 may omit or additionally provide other techniques to generate a signal to change modes. For example, certain modes may be based on specific programs being run, or situations being entered to. For example, a mode may be changed based on a television show being displayed on the display 163.

The signal may be generated from an assertion of an actuating device 170. Thus, when a user pushes the actuating device 170, the signal is propagated to the system 100.

The current mode detector 120, in response to the mode change receiver 110, detects the current mode stored in register 121. Register 121 may be any sort of solid state memory device configured to store a present state of the instrument cluster 160. Alternatively, through the ECU 150 or directly via bus 153, the system 100 may poll the instrument cluster 160 for an indication of the current mode.

The new mode decider 130 decides the new mode in which to drive the instrument cluster 160 to be situated in. In one example, the new mode decider 130 toggles the mode from a first mode to a second mode based on the current mode. Thus, if the current mode is the first mode, the new mode decider 130 decides the new mode is the second mode.

In another example, the signal received may indicate that the instrument cluster 160 is to be in a specific mode. For example, if the signal is generated because an application is engaged (i.e. content is requested via the display 163), the new mode decider 140 may decide that the mode is to be a specific mode configured for content display.

The new mode transmitter 140 transmits the selected new mode to the instrument cluster 160. The instrument cluster 160 includes a mechanical driver 165 that drives the various components of the instrument cluster 160 to be situated in a specific mode. Examples of mechanically driven modes will be discussed further in the figures and embodiments disclosed herein.

Figure 2A:
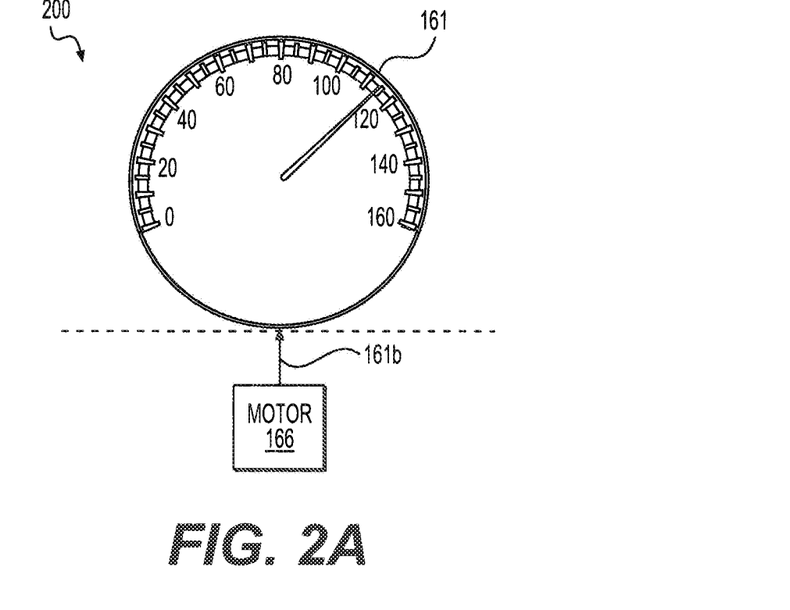
FIGS. 2(a) and (b) illustrate an example of a mechanical gauge 161 implemented with a mechanical driver according to the instrument cluster shown in FIG. 1.
Figure 2B:
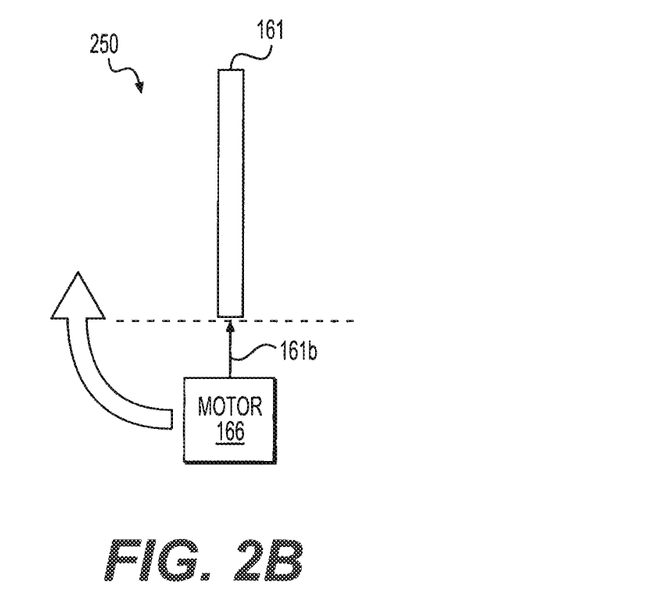

FIGS. 2(a) and (b) illustrate an example of a mechanical gauge 161 implemented with a mechanical driver 165 according to the instrument cluster 160 shown in FIG. 1. The concepts associated with mechanical gauge 161 may be applied to mechanical gauge 162 in a similar fashion. The remaining elements of instrument cluster 160 are not shown in FIG. 3 for explanatory purposes.

Referring to FIG. 2(a), a state 200 of the mechanical gauge 161 is shown. The state 200 reflects a first mode, in which the mechanical gauge 161 is significantly facing a driver or passenger of vehicle 180. The mechanical gauge 161 may be earmarked for any function of the vehicle 180, such as those enumerated in FIG. 1.

Also shown in FIG. 2(a) is a stem 161b. The stem 161b is driven by a motor 166. The stem 161b and the motor 166 may be significantly hidden from a driver or passenger of vehicle 180.

In FIG. 2(b), a state 250 is shown that reflects a second mode. The mechanical gauge 161 in the second mode has been rotated in a clockwise direction by stem 161b (for mechanical gauge 162, the rotation would be in a counter-clockwise direction). The mechanical gauge 161 in state 250 is now in an orientation in which the edges are facing the passenger or driver of the vehicle 180 (i.e. approximately 90 degrees). After a display 163 has been moved to a secondary location (as will be described in FIG. 3), the mechanical gauge 161 may be rotated to the position in state 200.

In an alternate example (not shown), the mechanical gauge 161 and the mechanical gauge 162 may slide out of the way. Thus, the mechanical gauges 161 and 162 may be displaced in a position to not obstruct the display 163. A plan view of the implementation of this embodiment is shown in FIGS. 5(a)-(e).

Figure 3A:
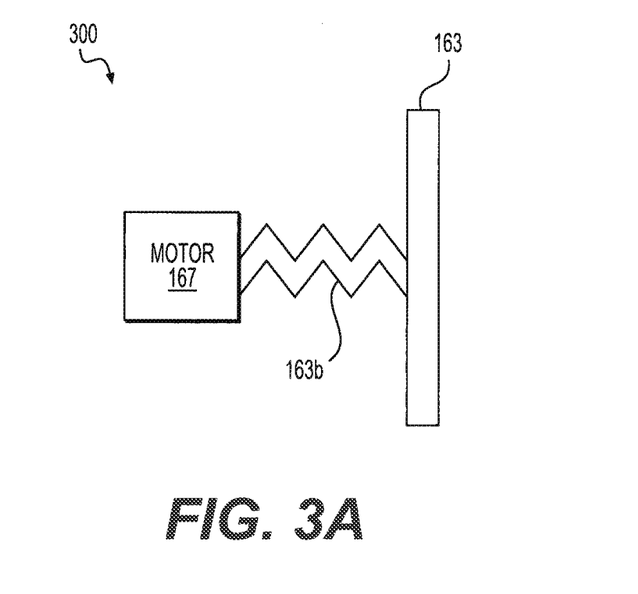
FIGS. 3(a) and (b) illustrate an example of a display 163 implemented with a mechanical driver according to the instrument cluster shown in FIG. 1.
Figure 3B:
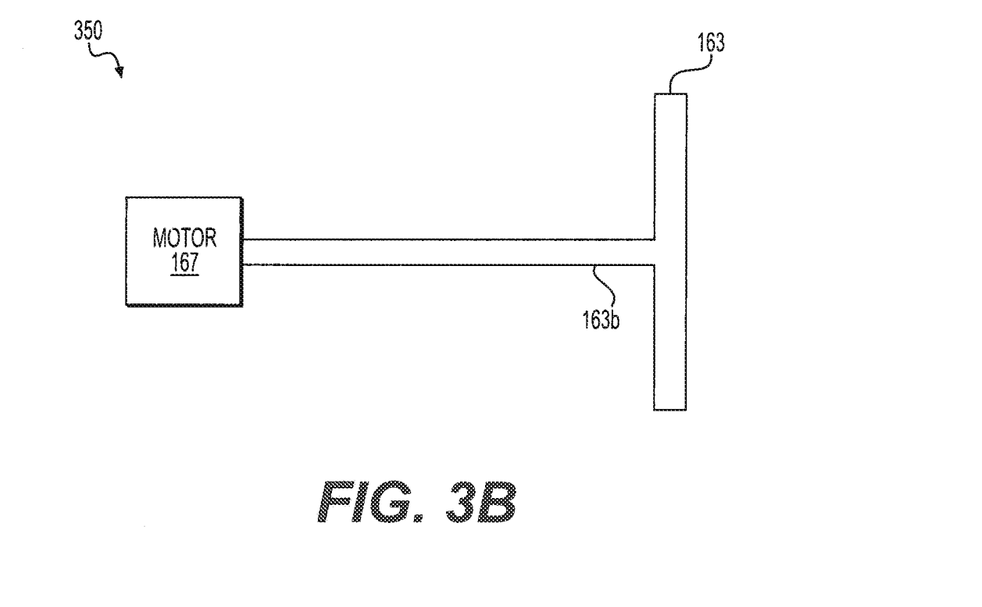

FIGS. 3(a) and (b) illustrate an example of a display 163 implemented with a mechanical driver 165 according to the instrument cluster 160 shown in FIG. 1.

In FIG. 3(a), state 300 shows the display 163 attached to a stem 163b. The stem 163b is driven by a motor 166, and based on various tracking technologies, is driven to be closer or further away based on the motor 166 being turned on or off. State 300 shows the display from the side.

In FIG. 3(b), state 350 shows the display 163 in a second mode. The second mode shows the stem 163b fully extended. Accordingly, the display 163 in the second mode may be closer to a driver or passenger of vehicle 180.

State 300 and 350 may correspond to states 200 and 250, respectively.

FIGS. 4(a)-(e) illustrate an example of a mechanically reconfigurable instrument cluster 160 according to an exemplary embodiment. The instrument cluster 160 shown in FIGS. 4(a)-(e) employ the aspects shown in FIGS. 1-3.

The instrument cluster 160 is significantly similar to the instrument cluster 160 shown in FIG. 1, and thus, includes the same components, such as a mechanical gauge 161, a mechanical gauge 162, and a display 163. A mechanical driver 165 is also included, but not shown for example purposes.

The instrument cluster 160 shown in FIGS. 4(a)-(e) show a transition from a first mode to a second mode.

Figure 4A:
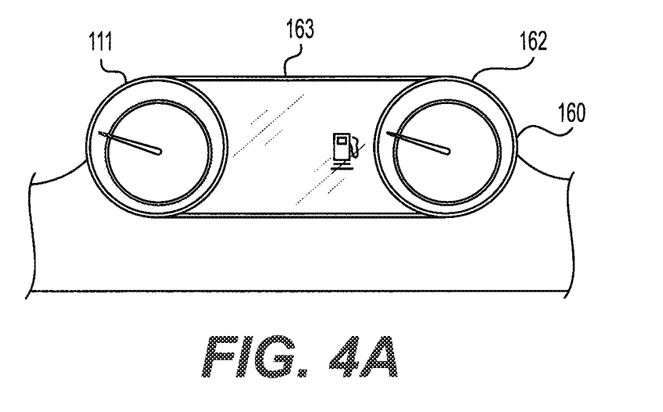
FIGS. 4(a)-(e) illustrate an example of a mechanically reconfigurable instrument cluster according to an exemplary embodiment.

Referring to FIG. 4(a), the instrument cluster 160 is in a first mode. In the first mode, the mechanical gauges 161 and 162 serve their purpose of providing information in which the mechanical gauges 161 and 162 are dedicated to. The gauges 161 and 162 partially obscure display 163. However, the instrument cluster 160 may selectively render information on the portions of the display 163 not obscured. Thus, the display 163 may serve to provide information associated with the operation of the vehicle.

Figure 4B:
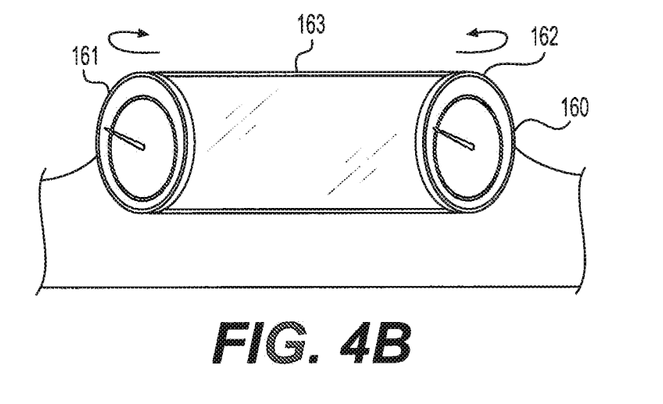

Referring to FIG. 4(b), the instrument cluster 160 receives an indication that the second mode is to be entered to. Thus, the mechanical gauges 161 and 162 start to transition in the manner described in FIGS. 2(a) and (b).

Figure 4C:
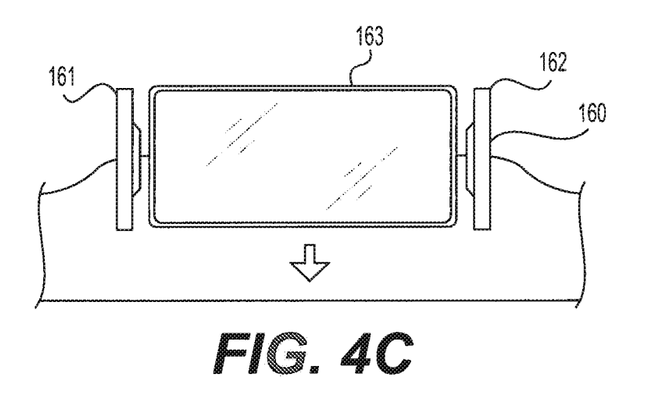

Referring to FIG. 4(c), the instrument cluster 160 transitions the display 163 in the manner described in FIGS. 3(a) and (b). Thus, display 163 is significantly projected in a manner that is closer to the vehicle 180's driver or passenger.

Figure 4D:
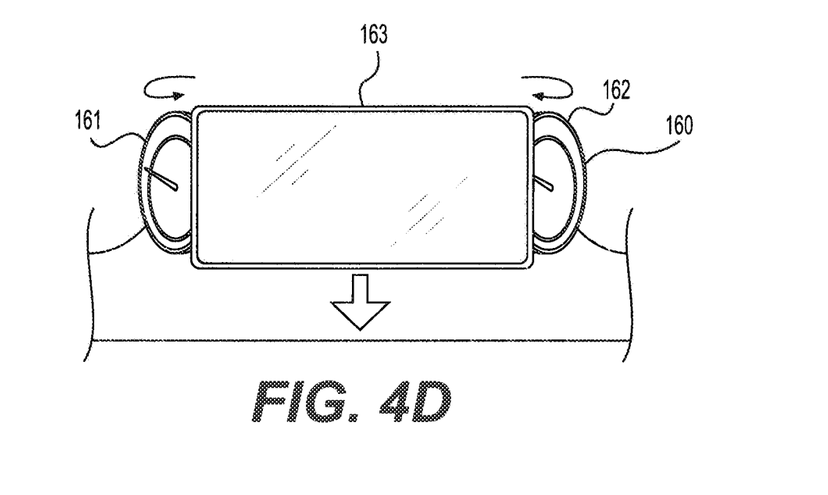

Referring to FIG. 4(d), the instrument cluster 160 transitions the mechanical gauges 161 and 162 to return to the positions the gauges were in in FIG. 4(a). The operation in FIG. 4(d) is optional.

Figure 4E:
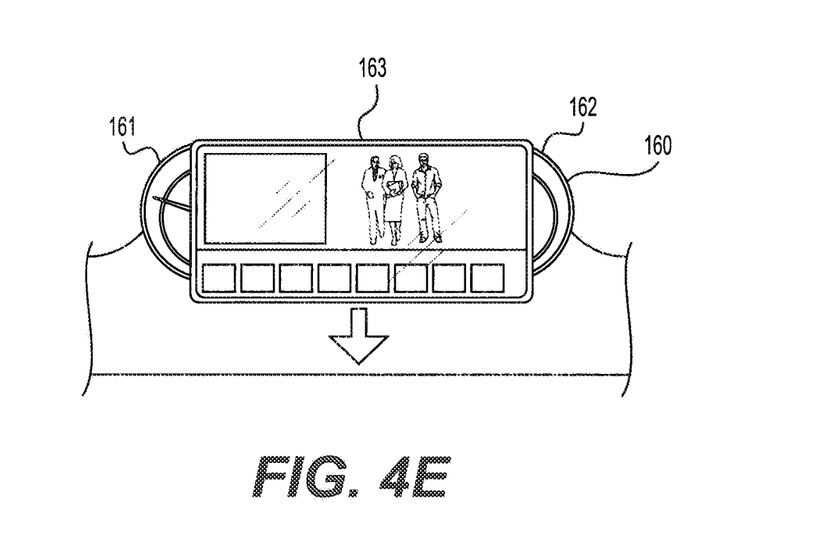
Figure 5A:
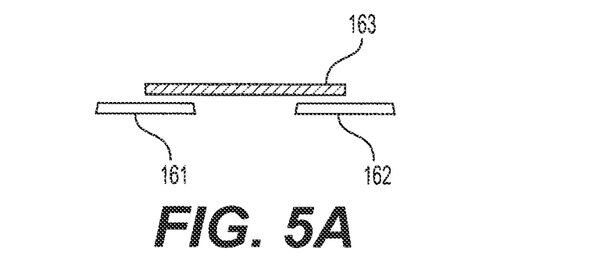
FIGS. 5(a)-(e) illustrate an example of another example of the mechanically reconfigurable instrument cluster according to another exemplary embodiment.
Figure 5B:
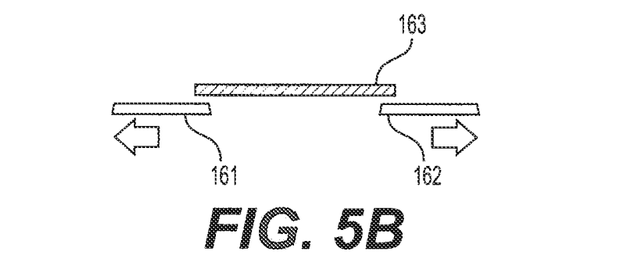
Figure 5C:
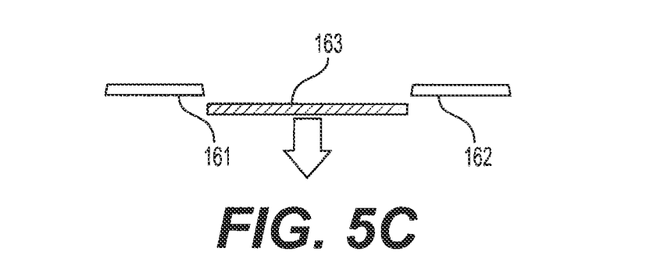
Figure 5D:
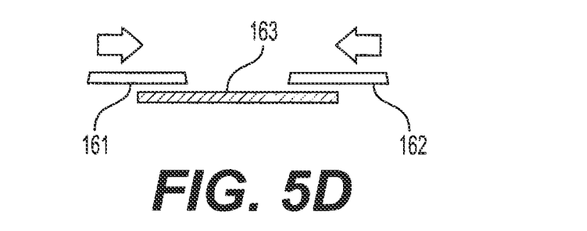
Figure 5E:
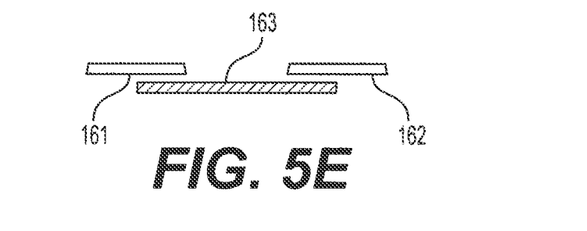

Referring to FIG. 4(e), the instrument cluster 160 shows the display 163 serving content. The content may be a movie, a television show, a video telephone conference, or even the operations associated with the vehicle.

FIGS. 5(a)-(e) illustrate an example of another example of the mechanically reconfigurable instrument cluster according to another exemplary embodiment. Referring to FIGS. 5(a)-(e), the operation is similar to those shown in FIGS. 4(a)-(e); however, instead of rotating away, the mechanical gauges are now slide-able, and may be slid to a location as to not obstruct the display 163 from moving inward and outward.

As explained in FIG. 1, various instigating actions may lead to the switch from the first mode (FIG. 4(a)) to the second mode (FIG. 4(e)). In another example, an operation of the vehicle 180 transitioning from an active driving mode, to an autonomous driving mode may enable the transition from the first mode to the second mode.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

We claim:

1. A system for controlling a mechanically reconfigurable instrument cluster, comprising:
    a mode change receiver to receive a signal indicating a change from a first mode to a second mode, or the second mode to the first mode;
    a current mode detector to detect whether the mechanically reconfigurable instrument cluster is in the first mode or the second mode;
    a new mode decider to determine whether a new mode is a first mode or the second mode based on the received signal or the detection; and
    a new mode transmitter to communicate the new mode to the mechanically reconfigurable instrument cluster, wherein the instrument cluster comprises: a first display portion to display information of a first type, the first display portion includes a stem about the first display portion's axis driven by a motor; a second display portion to display information of a second type, the second display portion being configured to move in an inward and outward direction, wherein in response to a signal instructing a transformation from the first mode to the second mode, the first display portion rotates about the axis, and the second display portion moves inward or outward.

2. The system according to claim 1, wherein the first display portion rotates about the axis before the second display portion is moves inward or outward.

3. The system according to claim 2, wherein the first display portion is a mechanical gauge, and the second display portion is a digital display.

4. The system according to claim 2, wherein the second mode is instigate from a transition to a non-autonomous driving mode to an autonomous driving mode.

5. The system according to claim 1, wherein the first mode pertains to a control of a vehicle.

6. The system according to claim 5, wherein the second mode pertains to a display of information via the second display portion.

\* \* \* \* \*